United States Patent [19]

Nakamura et al.

[11] Patent Number: 5,385,975
[45] Date of Patent: Jan. 31, 1995

[54] POLYSILOXANE-COMPOSITE POLYMER PARTICLES

[75] Inventors: Katsuhiro Nakamura; Minoru Kato; Yasuhisa Watanabe, all of Yokkaichi; Yasunori Matsubara, Kameyama; Yorinobu Ikeda, Yokkaichi; Yoshiaki Yonekawa, Suzuka; Hiroyuki Miki, Yokkaichi; Akio Hiraharu, Yokkaichi; Nobuyuki Ito, Yokkaichi; Osamu Kurita, Tsuchiura; Yasunobu Kaneko, Yokkaichi; Shouzou Nishida, Chiba, all of Japan

[73] Assignee: Japan Synthetic Rubber Co., Ltd., Tokyo, Japan

[21] Appl. No.: 109,990

[22] Filed: Dec. 28, 1992

Related U.S. Application Data

[63] Continuation of Ser. No. 673,337, Mar. 22, 1991, abandoned.

[30] Foreign Application Priority Data

Mar. 28, 1990 [JP] Japan ................................ 2-079698
Jun. 28, 1990 [JP] Japan ................................ 2-171024

[51] Int. Cl.⁶ ............................................. C08L 47/00
[52] U.S. Cl. ..................................... 525/101; 525/105; 525/106; 525/902
[58] Field of Search ................ 525/101, 105, 106, 902

[56] References Cited

U.S. PATENT DOCUMENTS

| | | | |
|---|---|---|---|
| 3,766,881 | 4/1973 | Lerner et al. | 260/37 SB |
| 4,369,289 | 1/1983 | Keogh | 525/105 |
| 4,859,740 | 8/1989 | Damrath et al. | 525/100 |
| 4,861,831 | 8/1989 | Damrath et al. | 525/100 |
| 4,975,486 | 12/1990 | Kasahara et al. | 525/72 |
| 4,990,556 | 2/1991 | Shimizu et al. | 524/475 |
| 5,066,721 | 11/1991 | Hamada et al. | 525/102 |
| 5,100,958 | 3/1992 | Fuhr et al. | 525/66 |
| 5,296,569 | 3/1994 | Noda et al. | 525/445 |

FOREIGN PATENT DOCUMENTS

| | | |
|---|---|---|
| 340580 | 8/1989 | European Pat. Off. . |
| 2166085 | 10/1973 | France . |
| WO90/00810 | 9/1990 | WIPO . |

*Primary Examiner*—John C. Bleutge
*Assistant Examiner*—Margaret W. Glass
*Attorney, Agent, or Firm*—Oliff & Berridge

[57] ABSTRACT

Polymer particles including polysiloxane is disclosed. The polymer particles are prepared by condensing at least one organosilane or organosiloxane compound in the presence of organic polymer particles which are prepared from specific monomers and dispersed in an aqueous medium. The polymer particles possess excellent water resistance, weatherability, water repellency, adhesion, and flexing resistance, and thus are useful as water paints, coating agents, carpet packing material, floor polishing agents, cementing medium, and the like.

23 Claims, No Drawings

POLYSILOXANE-COMPOSITE POLYMER PARTICLES

This is a continuation of application Ser. No. 07/673,337 filed Mar. 22, 1991, now abandoned.

BACKGROUND OF THE INVENTION

1. Field of the Invention

This invention relates to polymer particles comprising polysiloxane (hereinafter referred to as "polysiloxane-composite polymer particles"). The polymer particles possess excellent water resistance, weatherability, adhesion, flexing resistance, and the like, and are useful as water paints, coating agents, carpet packing material, floor polishing agents, cementing medium, and the like.

2. Description of the Background Art

Polysiloxane has superior resistances against heat, water, organic chemicals, acids, and alkalis, as well as excellent weatherability. It also exhibits outstanding adhesion to inorganic materials. Thus, it is widely used as a coating agent and the like (e.g. Japanese Patent Laid-open (kokai) No. 39691/1977).

Polysiloxane, however, possesses only poor mutual solubility with other hydrocarbon polymeric compounds, so that its advantages are very hard to exhibit when used in conjunction with such hydrocarbon polymeric compounds. This is the reason that the use of polysiloxane is limited.

In order to overcome this problem and to expand the fields in which polysiloxane is used, a method has been proposed to prepare a polysiloxane-polymer complex by dispersing polysiloxane having a low molecular weight in a medium and mixing the dispersion with other organic polymers, followed by removal of the dispersion medium. Problems in this method are that only few suitable dispersion mediums are is available and further that the addition of a dispersion adjuvant is required in order to keep the composition stable for a long period of time. In addition, such a dispersion adjuvant lowers the mutual solubility of polysiloxane and organic polymers. Another problem is that polysiloxane and organic polymers having inherently poor mutual solubility produce an unhomogeneous blend, rendering the removal of dispersing medium therefrom difficult.

Japanese Patent Laid-open (kokai) Nos. 370/1985, 110170/1980, 9463/1986, etc. disclose organic polymers prepared by the copolymerization of silane compounds having polymerizable unsaturated groups. The amount of silane compounds to be copolymerized, however, is limited and it is impossible to produce polymer particles having sufficient water resistance and weatherability.

Thus, there have been no methods by which polysiloxane having various advantageous characteristics but exhibiting poor mutual solubility with organic polymers is homogeneously composed in organic polymers.

SUMMARY OF THE INVENTION

In view of this situation, the present inventors have undertaken extensive studies in order to develop polysiloxane-composite polymer particles in which polysiloxane is homogeneously composed, and found that such polymer particles could effectively be obtained by condensing an organosilane or organosiloxane compound in the presence of organic polymer particles which are dispersed in an aqueous medium.

Accordingly an object of this invention is to provide polymer particles in which polysiloxane is composed, said polymer particle being prepared by condensing at least one organosilane compound in the presence of organic polymer particles which are dispersed in an aqueous medium.

Other objects, features and advantages of the invention will hereinafter become more readily apparent from the following description.

DETAILED DESCRIPTION OF THE INVENTION AND PREFERRED EMBODIMENTS

Organic polymer particles used in the present invention are those prepared by the emulsion polymerization of a monomer or a mixture of monomers selected from the group consisting of aliphatic conjugated dienes, ethylenically unsaturated carboxylic acid alkyl esters, aromatic vinyl compounds, and ethylenically unsaturated carboxylic acids.

Aliphatic conjugated dienes which can be used in the present invention include, for example, 1,3-butadiene, isoprene, and 2-chloro-1,3-butadiene. Of these, 1,3-butadiene is a preferable diene.

Given as examples of ethylenically unsaturated carboxylic acid alkyl esters are alkyl (meth)acrylates such as methyl (meth)acrylate, ethyl (meth)acrylate, propyl (meth)acrylate, n-butyl (meth)acrylate, i-butyl (meth)acrylate, t-butyl (meth)acrylate, amyl (meth)acrylate, i-amyl (meth)acrylate, hexyl (meth)acrylate, 2-ethylhexyl (meth)acrylate, and n-octyl (meth)acrylate; hydroxyalkyl (meth)acrylates such as hydroxymethyl (meth)acrylate, hydroxyethyl (meth)acrylate, hydroxypropyl (meth)acrylate, hydroxybutyl (meth)acrylate, hydroxyamyl (meth)acrylate, and hydroxyhexyl (meth)acrylate; and fluoroalkyl (meth)acrylates such as trifluoroethyl (meth)acrylate, pentadecafluorooctyl (meth)acrylate, and the like. Of these, preferable (meth)acrylates are methyl (meth)acrylate, ethyl (meth)acrylate, butyl (meth)acrylate, hydroxyethyl (meth)acrylate, hydroxybutyl (meth)acrylate, and the like.

Examples of aromatic vinyl compounds which can be used in the present invention include styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-t-butylstyrene, 2,4-dichlorostyrene, 2,6-dichlorostyrene, 1-vinyl-naphthalene, divinylbenzene, and the like. Of these, a preferable aromatic vinyl compound is styrene.

Ethylenically unsaturated carboxylic acids which can be used in the present invention include α,β-unsaturated carboxylic acid such as (meth)acrylic acid, fumaric acid, itaconic acid, monoalkyl itaconate, maleic acid, crotonic acid, 2-methacryloyl oxyethylhexahydrophthalic acid, and the like. Of these, preferable ethylenically unsaturated carboxylic acids are (meth)acrylic acid, itaconic acid, and the like.

Besides the above monomers, various other monomers can be used for preparing organic polymer particles. Such other monomers include: epoxydized compounds such as allyl glycidyl ether, glycidyl (meth)acrylate, and methylglycidyl (meth)acrylate; polyfunctional monomers such as divinyl benzene, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, tetrapropylene glycol di(- meth)acrylate, butanediol di(meth)acrylate, hexanediol di(meth)acrylate, trimethylolpropane tri(meth)acrylate, pentaerythrithol tetra(meth)acrylate, and the like; acid amides such as (meth)acrylic amide, N-methylol (meth)acrylic amide, N-methoxymethyl (meth)acrylic amide, N-butoxymethyl (meth)acrylic amide, N,N'-methylenebis acrylic amide, diacetone acrylic amide, maleic acid amide, maleimide, and the like; vinyl compounds such as vinyl chloride, vinylidene chloride, fatty acid vinyl esters, and the like; silicone compounds such as $\tau$-methacryloylpropanetrimethoxysilane, active silicone.

A preferable proportion of monomers to be used for the emulsion polymerization for producing organic polymer particles in this invention is as follows.

(a) 2–99.5% by weight of at least one monomer selected from the group consisting of aliphatic conjugated dienes and ethylenically unsaturated carboxylic acid alkyl esters, (b) 0.5–85% by weight of at least one monomer selected from the group consisting of aromatic vinyl compounds and ethylenically unsaturated carboxylic acids, and (c) 0–97.5% by weight of at least one monomer which is copolymerizable with monomers (a) and (b).

In this embodiment, inclusion of an unsaturated carboxylic acid alkyl ester as a component (a) monomer is more preferable.

Polysiloxane-composite polymer particles of the present invention are used in various applications, and there are preferable ranges in the proportion of monomers for producing organic polymer particles used in each of the applications.

For instance, when the polysiloxane-composite polymer particles are used as a water paint composition, the preferable range of monomers is as follows.

(a) 50–99.5% by weight of $C_{1\text{-}10}$-alkyl (meth)acrylates, (b) 0.5–15% by weight of ethylenically unsaturated carboxylic acids, and (c) 0–50% by weight of other ethylenically unsaturated monomers which are copolymerizable with monomers (a) and (b).

The following monomer composition is preferable for producing the polysiloxane-composite polymer particles used as a coating agent.

(a) 1–40% by weight of hydroxyalkyl (meth)acrylates, (b) 5–75% by weight of aromatic vinyl compounds, (c) 20–55% by weight of carboxylic acids, and (d) 0–14% by weight of other ethylenically unsaturated monomers which are copolymerizable with monomers (a), (b) and (c).

The following monomer composition is preferable for producing the polysiloxane-composite polymer particles used as a carpet packing material.

(a) 2–70% by weight of at least one monomer selected from the group consisting of aliphatic conjugated diene monomers, $C_{2\text{-}10}$-alkyl acrylates, and $C_{6\text{-}14}$-alkyl methacrylates, (b) 0–8% by weight of ethylenically unsaturated carboxylic acids, and (c) 22–98% by weight of other monomers which are copolymerizable with monomers (a) and (b).

The following monomer composition is preferable for producing the polysiloxane-composite polymer particles directed to a floor polish agent.

(a) 30–85% by weight of $C_{2\text{-}10}$-alkyl (meth)acrylates, (b) 1–30% by weight of ethylenically unsaturated carboxylic acids, and (c) 0–60% by weight of aromatic vinyl compounds.

The following monomer composition is preferable for producing the polysiloxane-composite polymer particles used as a cementing medium.

(a) 10–70% by weight of at least one monomer selected from the group consisting of aliphatic conjugated diene monomers and ethylenically unsaturated carboxylic acid $C_{4\text{-}12}$-alkyl esters, (b) 30–85% by weight of at least one monomer selected from the group consisting of aromatic vinyl compounds and ethylenically unsaturated carboxylic acid $C_{1\text{-}3}$-alkyl esters, and (c) 0–60% by weight of other ethylenically unsaturated monomers which are copolymerizable with monomers (a) and (b).

Organic polymer particles are prepared by the emulsion polymerization of the above monomers using known emulsifiers, polymerization initiators, and the like. As emulsifiers, anionic emulsifiers such as sodium dodecylbenzene sulfonate, sodium lauryl sulfate, sodium diphenyl disulfonate, sodium dialkyl sulfonate, and the like, or nonionic emulsifiers such as polyoxyethylene alkyl ester, polyoxyethylene alkylaryl ether and the like can be used, either singly or in combination.

The amount of emulsifiers to be used for the emulsion polymerization is usually 0.2–4% by weight, preferably 0.5–3% by weight, for the total amount of monomers. If the amount of emulsifiers is less than 0.2% by weight, the polymerization stability is impaired, e.g. giving rise to the formation of solid materials. The amount exceeding 4% by weight results in the products with decreased water resistance and weatherability.

Given as examples of polymerization initiators are persulfate initiators such as sodium persulfate and ammonium persulfate, inorganic initiators such as hydrogen peroxide, as well as organic initiators typified by organic peroxides such as cumene hydroperoxide, isopropylbenzene hydroperoxide, and paramethane hydroperoxide, and azo compounds such as azobisisobutylonitrile. The amount of the polymerization initiators to be used for the emulsion polymerization is usually 0.03–2% by weight, preferably 0.05–1% by weight, for the total amount of monomers.

In addition to the emulsifiers and polymerization initiators, various types of chain transfer agents, chelating agents, pH modifiers, electrolytes, and the like can be used together as required. Water is used for the emulsion polymerization usually in an amount of 80–300 parts by weight for 100 parts by weight of the monomers. The emulsion polymerization reaction is carried out using water, emulsifiers, polymerization initiators, and the like in the amounts defined above at a temperature of 10°–90° C., preferably 40°–85° C., for 1–30 hours. There are no restrictions as to the manner in which the monomers are added to the polymerization reaction system. The one-time addition, continuous addition, or intermittent addition and the like can be employed arbitrarily. If required, water-soluble polymeric compounds may be present while the organic polymer particles are produced.

The ultimate polymerization conversion rate is usually 90–100% by weight, and preferably 95–100% by weight. The said polymerization can be applicable to the preparation of the organic polymer particles used in the present invention.

The glass transition point of the organic polymer particles determined by the differential thermal analysis is between −60° C. and +160° C., and preferably between −30° C. and +100° C. The toluene insoluble components of the organic polymer particles is 98% by weight or smaller, and preferably 95% by weight or smaller. In the present invention, the toluene insoluble components can be determined as follows, i.e. the latex is adjusted to pH 7-9, solidified, dried, dissolved into toluene at 20° C. for 20 hours, and sieved through a 200 mesh sieve, following which the insoluble components which do not pass through the sieve are determined. The amount (wt. %) of the insoluble components in the total solid components is taken as the toluene insoluble components.

Organosilane or organosiloxane compounds are then subjected to the condensation reaction in an aqueous medium in the presence of the organic polymer particles thus prepared.

Organosilane or organosiloxane compounds which can be used in the present invention are, for example, compounds represented by the following formulae (I) and (II),

  (I)

wherein R is an organic group having 1-8 carbon atoms, R' is an alkyl group having 1-5 carbon atoms or an acyl group having 1-4 carbon atoms, and n is a value of 1-3,

  (II)

wherein R is the same as defined for formula (I) and m is a value of 0-3.

Specific examples of the organic group having 1-8 carbon atoms represented by R in formulae (I) and (II) include alkyl groups, e.g. methyl, ethyl, n-propyl, and i-propyl; τ-chloropropyl group, vinyl group, 3,3,3-trifluoropropyl group, τ-glycidoxypropyl group, τ-methacryloxypropyl group, τ-mercaptopropyl group, phenyl group, 3,4-epoxycyclohexyl-ethyl group, τ-aminopropyl group, and the like. Of these, alkyl groups are preferable. Given as specific examples of the alkyl group having 1-5 carbon atoms or the acyl group having 1-4 carbon atoms represented by R' in formula (I) are methyl, ethyl, n-propyl, n-butyl, sec-butyl, tert-butyl, acetyl, and the like groups. Of these, alkyl groups are preferable. Organosilane compounds of Formula I having a larger carbon atom content of R or R' have a poor water solubility, resulting in a decreased absorption rate of the organosilane compound to organic polymer particles.

Enumerated as specific examples of the organosilane compounds of formula (I) are tetramethoxysilane, tetraethoxysilane, tetrapropoxysilane, tetrabutoxysilane, methyl trimethoxysilane, methyl triethoxysilane, ethyl trimethoxysilane, ethyl triethoxysilane, n-propyl trimethoxysilane, n-propyl triethoxysilane, i-propyl trimethoxysilane, i-propyl triethoxysilane, τ-chloropropyl trimethoxysilane, τ-chloropropyl triethoxysilane, vinyl trimethoxysilane, vinyl triethoxysilane, 3,3,3-trifluoropropyl trimethoxysilane, 3,3,3-trifluoropropyl triethoxysilane, τ-glycidoxypropyl trimethoxysilane, τ-glycidoxypropyl triethoxysilane, τ-methacryloxypropyl trimethoxysilane, τ-methacryloxypropyl triethoxysilane, τ-mercaptopropyl trimethoxysilane, τ-mercaptopropyl triethoxysilane, phenyl trimethoxysilane, phenyl triethoxysilane, τ-aminopropyl trimethoxysilane, 3,4-epoxycyclohexylethyl trimethoxysilane, 3,4-epoxy-cyclohexylethyl triethoxysilane, dimethyl diethoxysilane, dimethyl dimethoxysilane, and the like.

Given as specific examples of the organosilane or organosiloxane compounds of formula (II) are cyclic compounds such as hexaphenylcyclotrisiloxane, octaphenylcyclotetrasiloxane, tetravinyltetramethylcyclotetrasiloxane, hexamethylcyclotrisiloxane, octamethylcyclotetrasiloxane, pentamethylcyclotetrasiloxane, hexamethylcyclotetrasiloxane, tetramethylcyclotetrasiloxane, decamethylcyclopentasiloxane, dodecamethylcyclohexasiloxane, trimethyltriphenylcyclotrisiloxane, and the like, as well as linear and branched organopolysiloxanes.

Among these, preferable organosilane compounds are the organosilane compounds of formula (I), especially, tetramethoxysilane, tetraethoxysilane, methyl trimethoxysilane, methyl triethoxysilane, dimethyl diethoxysilane, dimethyl dimethoxysilane, and the like.

These organosilane compounds can be used either individually or in combination. Metal alkoxides, e.g. titanium alkoxide or aluminum alkoxide, and, if required, known silane coupling agents, can be used together with organosilane compounds. The organosilane compounds can be used dissolved in an organic solvent, if necessary.

An aqueous medium used for dispersing organic polymer particles therein in the preparation of the polysiloxane-composite polymer particles of the present invention may be water or a mixture of water and water-miscible solvent, e.g. a ketone, a lower alcohol, an ester. Although it is possible to use such a solvent in a range of 0-45% by weight for water, a preferable proportion for keeping excellent dispersion conditions of the copolymer emulsion is less than 20% by weight, and more preferably less than 5% by weight.

In order to obtain the intended polysiloxane-composite polymer particles, the amount of organosilane or organosiloxane compounds to be used for 100 parts by weight of organic polymer particles (as solid portion) is 0.02-500 parts by weight, preferably 0.1-500 parts by weight preferably 0.1-200 parts by weight, more preferably 0.5-100 or 1-100 parts by weight, and more preferably 1-50 parts by weight. Exceptionally good results are obtained by the use of organosilane or organosiloxane compounds in an amount of 5-50 parts by weight for 100 parts by weight of organic polymer particles. If the amount is less than 0.1 part by weight, the resulting polysiloxane-composite polymer particles have only insufficient water resistance and weatherability; if greater than 500 parts by weight, the amount of polysiloxane in the particles is excessive, resulting in decreased store stability.

Organosilane or organosiloxane compounds are usually absorbed in the organic polymer particles, but they may not be absorbed in the organic polymer particles. It is desirable that at least 5% by weight, preferably 10% by weight, and more preferably 30% or at least 50% by weight, of organosilane or organosiloxane compounds is absorbed in the organic polymer particles.

The absorption of organosilane or organosiloxane compounds into the organic polymer particles can easily be attained by adding the organosilane or organosiloxane compounds to an aqueous medium in which the organic polymer particles are dispersed, followed by thorough stirring of the mixture. If necessary in order to ensure effective absorption of organosilane or organosiloxane compounds into organic polymer particles, it is possible to absorb a solvent with the solubility to water of $10^{-3}\%$ by weight into the organic polymer particles in advance.

The condensation reaction of organosilane or organosiloxane compounds can be carried out at a temperature higher than 30° C., preferably higher than 50° C., and more preferably higher than 70° C., and at a pH of 4–10, preferably 5–9, and more preferably 6–8. The polymerization degree of organosilane or organosiloxane compounds can easily be controlled by adjusting the reaction temperature and the pH.

Polysiloxane-composite polymer particles thus prepared have an average particle size 5 μm or smaller, preferably 0.03–3 μm, and more preferably 0.05–1 μm.

The polysiloxane-composite polymer particles of the present invention have a structure in which islands of polysiloxane scatter over the continuous phase of organic polymer particles or polysiloxane and organic polymer particles form an interpenetrating polymer network. Even if organosilane compounds are scarcely absorbed by the organic polymer particles, polysiloxanes form a composite with the organic polymer particles by being present localized on the surface of the organic polymer particles.

Polysiloxane-composite polymer particles of the present invention can be prepared into aqueous dispersion compositions directed to various applications, in which composition the polymer particles are incorporated in an amount of 10–75% by weight, and preferably 15–70% by weight. The aqueous dispersions may contain other components such as defoaming agents, foaming agents, pigments, flame retardant agents, preservatives, antioxidants, stabilizers, vulcanizing accelerators, antistatic agents, pH adjusting agents, and the like.

Especially, when the aqueous dispersion composition is used as a water-paint, it may contain such components as fillers such as calcium carbonate, aluminum hydroxide, magnesium hydroxide, clay, barium sulfate, silicic acid, silicates, magnesium carbonate, and the like; dispersing agents such as sodium polyacrylate, ammonium polyacrylate, sodium hexamethaphosphate, potassium pyrophosphate, and the like; viscosity increasing agents such as hydroxyethyl cellulose, high molecular weight sodium polyacrylate, and the like; plasticizers such as dioctyl phthalate, dibutyl phthalate, epoxylated fatty acid esters, and the like; adjuvants such as n-propyl alcohol, ethyl cellosolve, carbitol, ethylene glycol, diethylene glycol, and the like; hardeners such as melamine-formaline resin, glyoxal resin, epoxy resin, inorganic metal complexes, aziridine compounds, and the like; and leveling agents such as rosin-modified polyester resin, styrene-maleic anhydride copolymer resin, and the like.

For compositions used as coating agents, organic solvents which can improve film-foaming or wetting performance, e.g. alcohols, such as methyl alcohol, ethyl alcohol, propyl alcohol, butyl alcohol, amyl alcohol, and hexyl alcohol; methyl cellosolve, ethyl cellosolve, propyl cellosolve, butyl cellosolve, hexyl cellosolve, methyl carbitol, ethyl carbitol, methyl cellosolve acetate, tributoxymethyl phosphate, and the like can be incorporated. Other components which can be incorporated in the coating composition include various resins such as water-soluble acrylic resin, water-soluble polyester resin, water-soluble or water-dispersible epoxy resin, water-soluble or water-dispersible acrylic resin, carboxylated aromatic vinyl resin, e.g. styrene-melic acid resin, and urethane resin; lubricants, defoaming agents, wetting agents, leveling agents, pigments, and the like.

Polysiloxane-composite polymer particles of the present invention have excellent water resistance and weatherability themselves, and their aqueous dispersion liquid exhibits the following advantageous characteristics.

(1) Good water repellency, water resistance, weatherability, and outstanding adhesion to organic materials.

These characteristics make the composition comprising the polysiloxane-composite polymer particles suitable for use in such applications as clear paints and enamel paints for painting inner and outer surfaces of buildings, steel structures, roofs, floors, and other building materials.

(2) Superior store stability, hot water resistance, flexing ability, adhesion, lubricity, and water repellency.

Owing to these characteristics the composition can find the use as coating agents for metals, plastics, woods, ceramics, etc., especially for coating metals such as metallic cans or aluminum frames, or for the manufacture of precoat metals.

(3) Excellent adhesion, water resistance, and the aging resistance by heat.

These characteristics make the composition comprising the polysiloxane-composite polymer particles particularly suitable for use as a packing material for tafted carpets, electric carpets, needle-punch carpets, artificial lawn, and automobile carpets. They are especially suitable as a packing material for pads which are backed by tafted carpets.

(4) Excellent anti-blackheel mark, i.e., the resistance against being soiled by the back of rubber heels, and anti-scuff properties makes the composition suitable for use as water-soluble floor polishing agents, (5) The composition can improve the bending strength, press strength, water resistance, weatherability when incorporated into cementing mortar or cementing concrete.

Of the above applications of the composition of the present invention, the application to water-paints is most promising.

Other features of the invention will become apparent in the course of the following description of the exemplary embodiments which are given for illustration of the invention and are not intended to be limiting thereof.

EXAMPLES

EXAMPLES 1–4

(1) Into a stainless autoclaved flask equipped with a condenser, a nitrogen gas introducing port, a thermometer, a stirrer, a monomer addition pump were charged 100 parts by weight of ion-exchanged water and 0.5 part by weight of potassium persulfate, as a polymerization initiator, followed by replacement of vapor phase by nitrogen gas for 15 minutes. The mixture was heated to 80° C.

A pre-emulsion was prepared in a separate container by blending a mixture of 50 parts by weight of ion-exchanged water, 1.0 part by weight of ammonium salt of polyoxyethylene alkylphenyl ether sulfate, 0.5 part by weight of sodium alkylbenzene sulfonate, and monomers listed in Table 1.

The pre-emulsion was charged dropwise to the flask over 4 hours at 80° C. while stirring and introducing nitrogen gas. After completion of the addition, the mixture was stirred for a further 2 hours at 85° C., following which the mixture was cooled to 25° C. to obtain an aqueous dispersion of organic polymer particles. The polymerization conversion was 98% for all monomers.

(2) The aqueous dispersion of organic polymer particles prepared in (1) above was adjusted to pH 7 at 25° C., followed by the addition of organosilane compounds listed in Table 1 and by vigorous stirring for 30 minutes. After heating the reaction vessel to 60° C., the mixture was reacted for 3 hours to obtain polysiloxane-composite polymer particles.

EXAMPLES 5-8

(1) Into a 100 l stainless steel autoclave were charged monomers listed in Table 1, 0.7 part by weight of potassium persulfate, as a polymerization initiator, 0.5 part by weight of sodium sulfate and 0.5 part by weight of potassium carbonate, as electrolytes, 0.1 part by weight of sodium ethylenediaminetetra acetate, and 150 parts by weight of water. The mixture was subjected to emulsion polymerization at 50°-80° C. while stirring to obtain organic polymer particles. The polymerization conversion rate was 98% for all monomers.

(2) 100 parts by weight of organic polymer particles prepared in (1) above (as solid portion) were diluted to 300 parts by weight by the addition of water, charged into a stainless container equipped with a stirrer, and adjusted to pH 7 at 25° C., followed by the addition of organosilane compounds listed in Table 1 and by vigorous stirring for 30 minutes. After heating the reaction vessel to 60° C., the mixture was reacted for 3 hours to obtain polysiloxane-composite polymer particles.

EXAMPLE 9

(1) A heater and a nitrogen gas introducing port were fitted to a stainless steel autoclaved flask equipped with a stirrer, a thermometer, and a monomer charge pump. Into the flask were charged 120 parts by weight of water, 1 part by weight of polyvinyl alcohol (Gosenol GL-05: trademark, manufactured by Japan Synthetic Rubber Co.), 5 parts by weight of ammonium salt of styrene-maleic acid resin (ammonium salt of 2625A-trademark, manufactured by Fujii Yoshimichi Shokai Co.), 3 parts by weight of ammonium salt of styrene-acrylic acid resin (ammonium salt of J-678-trademark, manufactured by Johnson Polymer Co.), 1 part by weight of acrylamide, and 0.3 part by weight of sodium persulfate, followed by replacement of vapor phase by nitrogen gas for 15 minutes. The mixture was heated to 75° C. To the mixture was added continuously over a period of 3 hours a mixture of 9 parts by weight of n-butyl methacrylate, 25 parts by weight of methyl methacrylate, 15 parts by weight of 2-hydroxyethyl methacrylate, 40 parts by weight of styrene, and 10 parts by weight of ethyl acrylate. After completion of the addition, the mixture was stirred for a further 2 hours at 85°-95° C., following which the mixture was cooled to 25° C. and adjusted to pH 8 by the addition of dimethylethanolamine to obtain an aqueous dispersion of organic polymer particles.

(2) The organosilane or organosiloxane compounds of Table 1 were added to the aqueous dispersion of organic polymer particles, followed by vigorous stirring for about 1 hour. After heating to 70° C., the mixture was reacted for 3 hours to obtain polysiloxane-composite polymer particles.

EXAMPLE 10

(1) An aqueous dispersion of organic polymer particles was prepared in the same manner as in Example 9, except that 2 parts by weight of polyvinyl alcohol, 10 parts by weight of ammonium salt of styrene-maleic acid resin, and 10 parts by weight of ammonium salt of styrene-acrylic acid resin, and monomers listed in Table 1 were used.

(2) The organosilane or organosiloxane compounds of Table 1 were added to the aqueous dispersion of organic polymer particles, followed by vigorous stirring for about 1 hour. After heating to 70° C., the mixture was reacted for 3 hours to obtain polysiloxane-composite polymer particles.

EXAMPLE 11

Polysiloxane-composite polymer particles were prepared in the same manner as in Example 7, except that organosilane compounds of Table 1 were used.

EXAMPLE 12

Polysiloxane-composite polymer particles were prepared in the same manner as in Example 1, except that organosilane compounds of Table 1 were used.

Comparative Example 1

(1) 50 parts by weight of water was charged into a stainless steel container and to this was added and dissolved 0.3 part by weight of sodium alkylbenzene sulfonate. 10 parts by weight of methyltriethoxysilane was added and the mixture was heated to 60° C. while thoroughly stirring, followed by the reaction for 3 hours to obtain a polysiloxane emulsion.

(2) An aqueous dispersion of organic polymer particles was prepared in the same manner as in Example 1 (1), except that the amount of ion-exchanged water charged into the autoclave was 50 parts by weight. After adjusting the aqueous dispersion to pH 7, the above polysiloxane emulsion was added to produce a mixed dispersion of polysiloxane and organic polymer particles.

Comparative Example 2

A mixed dispersion of polysiloxane and organic polymer particles was prepared in the same manner as in Comparative Example 1, except that the aqueous dispersion of organic polymer particles was prepared following the procedure of Example 5 (1).

Comparative Example 3

Polymer particles were prepared in the same manner as in Example 3 (1), except that the organic polymer particles were prepared in the presence of 10 parts by weight of methyltriethoxysilane.

Comparative Example 4

Polymer particles were prepared in the same manner as in Example 1 (1), except that the organic polymer particles were prepared in the presence of 10 parts by weight of vinyltriethoxysilane.

TABLE 1

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (Composition of Monomers: parts by weight) | | | | | | | | | | | | |
| Butadiene | — | — | — | — | 45 | 50 | 35 | 45 | — | — | 35 | — |
| Butyl methacrylate | — | — | — | 9 | — | — | — | — | 9 | 9 | — | — |
| n-Butyl acrylate | 50 | — | — | — | — | — | — | — | — | — | — | 50 |
| 2-Ethylhexyl acrylate | — | 45 | — | 20 | — | — | — | — | — | — | — | — |
| Methyl methacrylate | 28 | 23 | 60 | 23 | 10 | — | — | 10 | 25 | 20 | — | 28 |
| Hydroxyethyl methacrylate | — | — | — | — | — | — | — | — | 15 | 10 | — | — |
| Hydroxypropyl methacrylate | — | — | — | — | — | — | — | — | — | 20 | — | — |
| Ethyl acrylate | — | — | — | — | — | — | — | — | 10 | — | — | — |
| Acrylamide | — | — | — | — | — | — | — | 1 | 1 | — | — | — |
| Acrylonitrile | — | — | — | 5 | — | — | — | — | — | — | — | — |
| Ethylene glycol dimethacrylate | — | — | — | — | — | — | — | — | — | 1 | — | — |
| Styrene | 20 | 30 | 20 | 45 | 42 | 47 | 64 | 43.5 | 40 | — | 64 | 20 |
| Acrylic acid | 2 | — | — | 7 | 1.5 | 1 | 1 | 0.5 | — | — | 1 | 2 |
| Methacrylic acid | — | 2 | 20 | — | 1.5 | 2 | — | — | — | — | — | — |
| Composition of Organosilane of Organosiloxane Compounds: parts by weight) | | | | | | | | | | | | |
| Methyltriethoxysilane | 10 | — | 10 | — | — | — | — | — | 10 | — | — | — |
| Dimethyldiethoxysilane | — | 10 | — | 20 | — | — | — | — | — | — | — | — |
| Tetraethoxysilane | — | — | — | — | 6 | 6 | 3 | — | — | — | — | — |
| τ-Glycidoxypropyltrimethoxysilane | — | — | — | — | 5 | — | — | 5 | — | — | — | — |
| Methyltrimethoxysilane | — | — | — | — | — | — | — | — | 30 | 30 | — | — |
| Tetramethylcyclotetra siloxane | — | — | — | — | — | — | — | — | — | — | 10 | — |
| Octamethylcyclotetra siloxane | — | — | — | — | — | — | — | — | — | — | — | 10 |
| Particle size of polysiloxane-composite polymer particles (μm) | 2,500 | 2,000 | 850 | 900 | 1,500 | 1,300 | 1,800 | 2,200 | 2,100 | 2,000 | 1,800 | 2,500 |

Test Examples

Films with a thickness of 2.0 mm were prepared from the products of Examples 1–12 and Comparative Examples 1–4, first by preparing aqueous dispersions of polymer particles with a solid component concentration of 30% by weight, adding a film forming adjuvant, if necessary, applying the dispersion to substrates, and drying them in a hot air drier at 50° C. for 12 hours.

The following characteristics were studied on each film.

(1) Water Contact Angle

The water contact angles were determined using the Contact Angle Tester (a product of Elmer Photo Co.) by dropping distilled water drops onto films.

(2) Adhesion

Adhesion was determined according to JIS K5400 using a zinc galvanized steel plate for the substrate and complying with the following evaluation standard.

AAA: Does not peel off
BBB: Peel-off area is less than 10% of the total area
CCC: Peel-off area is 10–50% of the total area
DDD: Peel-off area is more than 50% of the total area (3) Weatherability The films were exposed to Sunshine Weather Meter, Dew Cycle WEL-SUN-DC (trademark, a product of Suga Test Machine Manufacturing. Co.) for 300 hours, following which the degree of color change into yellow was determined by the SM Color Computer, SM-5-IS-3B (trademark, a product of Suga Test Machine Manufacturing. Co.).

(4) Water Resistance

Whiteness of the films was measured after dipping them in water at 20° C. for 24 hours.

AAA: Excellent
BBB: Good
CCC: Normal
DDD: Bad

The results are shown in Table 2.

TABLE 2

| | Water Contact Angle (°) | Adhesion | Weatherability (ΔYI) | Water Resistance |
|---|---|---|---|---|
| Example | | | | |
| 1 | 88 | AAA | 4 | AAA |
| 2 | 86 | AAA | 6 | AAA |
| 3 | 87 | AAA | 3 | AAA |
| 4 | 86 | AAA | 4 | AAA |
| 5 | 79 | AAA | 6 | AAA |
| 6 | 78 | AAA | 5 | AAA |
| 7 | 81 | AAA | 3 | AAA |
| 8 | 80 | AAA | 4 | AAA |
| 9 | 85 | AAA | 3 | AAA |
| 10 | 88 | AAA | 2 | AAA |
| 11 | 75 | AAA | 3 | AAA |
| 12 | 80 | AAA | 2 | AAA |
| Comparative Example | | | | |
| 1 | 80 | DDD | 9 | DDD |
| 2 | 78 | DDD | 8 | DDD |
| 3 | 57 | CCC | 13 | CCC |
| 4 | 61 | CCC | 10 | CCC |

EXAMPLE 13–14

(Preparation of Water Paint)

Water paint compositions (Examples 13 and 14) of the following formulation were prepared by using polysiloxane-composite polymer particles prepared in Examples 1 and 2.

| <Formulation> | % by weight |
|---|---|
| Polysiloxane-composite polymer particles prepared in Example 1 or 2 | 60 |
| Titanium oxide | 27 |
| Sodium salt of polycarboxylic acid (Dispersion adjuvant) | 5 |
| Hydroxyethyl cellulose (Viscosity increasing agent) | 2 |
| 2,2,4-Trimethyl-1,3-pentane-diolmonoisobutylate (Plasticiser) | 3 |

-continued

| <Formulation> | % by weight |
|---|---|
| Ion-exchanged water | 3 |

<Characteristics>

The water contact angle, adhesion, weatherability, and water resistance were measured on the water paints of Examples 13 and 14. In addition, the gloss retention rate was determined on the films exposed to Sunshine Weather Meter, Dew Cycle WEL-SUN-DC, for 300 hours by measuring the mirror phase glossiness at 60° according to JIS K5400.

The results are shown in Table 3.

TABLE 3

|  | Example 13 | Example 14 |
|---|---|---|
| Polysiloxane-composite polymer particles | Prepared in Example 1 | Prepared in Example 2 |
| Weatherability |  |  |
| Gloss retention (%) | 68 | 65 |
| Color change into Yellow ($\Delta YI$) | 4 | 6 |
| Adhesion | AAA | AAA |
| Water resistance | AAA | AAA |
| Water repellency (Water Contact Angle) | 86 | 84 |

Obviously, numerous modifications and variations of the present invention are possible in light of the above teachings. It is therefore to be understood that within the scope of the appended claims, the invention may be practiced otherwise than as specifically described herein.

What is claimed is:

1. Polysiloxane-composite polymer particles, comprising organic polymer particles having a continuous organic polymer phase and a discontinuous polysiloxane phase, said discontinuous polysiloxane phase comprising localized regions of polysiloxane dispersed in said continuous organic polymer phase.

2. Polymer particles according to claim 1, wherein said organic polymer particles are those prepared by polymerizing monomer or monomers selected from the group consisting of aliphatic conjugated dienes, ethylenically unsaturated carboxylic acid alkyl esters, aromatic vinyl compounds, and ethylenically unsaturated carboxylic acids.

3. Polymer particles according to claim 1, wherein said organic polymer particles are those prepared by emulsion polymerization of monomers comprising:
    (a) 2–99.5% by weight of at least one monomer selected from the group consisting of aliphatic conjugated dienes and ethylenically unsaturated carboxylic acid alkyl esters,
    (b) 0.5–85% by weight of at least one monomer selected from the group consisting of aromatic vinyl compounds and ethylenically unsaturated carboxylic acids, and
    (c) 0–97.5% by weight of at least one monomer which is copolymerizable with monomers (a) and (b).

4. Polymer particles according to claim 1, wherein said organic polymer particles are those prepared by emulsion polymerization of monomers comprising:
    (a) 50–99.5% by weight of $C_{1-10}$-alkyl (meth)acrylates,
    (b) 0.5–15% by weight of ethylenically unsaturated carboxylic acids, and
    (c) 0–50% by weight of other ethylenically unsaturated monomers which are copolymerizable with monomers (a) and (b).

5. Polymer particles according to claim 1, wherein said organic polymer particles are those prepared by emulsion polymerization of monomers comprising:
    (a) 1–40% by weight of hydroxyalkyl (meth)acrylates,
    (b) 5–75% by weight of aromatic vinyl compounds,
    (c) 20–55% by weight of carboxylic acids, and
    (d) 0–14% by weight of other ethylenically unsaturated monomers which are copolymerizable with monomers (a), (b) and (c).

6. Polymer particles according to claim 1, wherein said organic polymer particles are those prepared by emulsion polymerization of monomers comprising:
    (a) 10–70% by weight of at least one monomer selected from the group consisting of aliphatic conjugated diene monomers and ethylenically unsaturated carboxylic acid $C_{4-12}$-alkyl esters,
    (b) 30–85% by weight of at least one monomer selected from the group consisting of aromatic vinyl compounds and ethylenically unsaturated carboxylic acid $C_{1-3}$-alkyl esters, and
    (c) 0–60% by weight of other ethylenically unsaturated monomers which are copolymerizable with monomers (a) and (b).

7. Polymer particles according to claim 1, wherein said organic polymer particles are those prepared by emulsion polymerization of monomers comprising:
    (a) 30–85% by weight of $C_{2-10}$-alkyl (meth)acrylate monomers,
    (b) 1–30% by weight of ethylenically unsaturated carboxylic acids, and
    (c) 0–60% by weight of aromatic vinyl compounds.

8. Polymer particles according to claim 1, wherein said organic polymer particles are those prepared by emulsion polymerization of monomers comprising:
    (a) 2–70% by weight of at least one monomer selected from the group consisting of aliphatic conjugated diene monomers, $C_{2-10}$-alkyl acrylates, and $C_{6-14}$-alkyl methacrylates,
    (b) 0–8% by weight of ethylenically unsaturated carboxylic acids, and
    (c) 22–98% by weight of other monomers which are copolymerizable with monomers (a) and (b).

9. Polymer particles according to claim 1, wherein said polymer particles are prepared by condensing at least one organosilane or organosiloxane compound in the presence of organic polymer particles that are dispersed in an aqueous medium.

10. Polymer particles according to claim 9, wherein said organosilane compound is a compound represented by the following formula (I),

$$R_nSi(OR')_{4-n} \qquad (I)$$

wherein R is an organic group having 1–8 carbon atoms, R' is an alkyl group having 1–4 carbon atoms or an acyl group having 1–4 carbon atoms, and n is a value of 1–3.

11. Polymer particles according to claim 9, wherein said organosiloxane compound is a compound represented by the following formula (II),

$$R_mSiO_{(4-m)/2} \qquad (II)$$

wherein R is the same as defined for formula (I) and m is a value of 0–3.

12. Polymer particles according to claim 9, comprising 0.02–500 parts by weight of said organosilane or organosiloxane compound for 100 parts by weight of said organic polymer particles.

13. Polymer particles according to claim 9, comprising 0.1–200 parts by weight of said organosilane or organosiloxane compound for 100 parts by weight of said organic polymer particles.

14. Polymer particles according to claim 9, comprising 1–100 parts by weight of said organosilane or organosiloxane compound for 100 parts by weight of said organic polymer particles .

15. Polymer particles according to claim 9, wherein at least 20% of the organosilane or organosiloxane compound is absorbed in the organic polymer particles.

16. Polymer particles according to claim 9, wherein at least 50% by weight of the organosilane or organosiloxane compound is absorbed in the organic polymer particles.

17. Polymer particles according to claim 1 having an average size of 5 μm or smaller.

18. Polymer particles according to claim 1, wherein said polymer particles have an average particle size of up to 1 μm.

19. Polysiloxane-composite polymer particles, comprising organic polymer particles having a continuous organic polymer phase and localized islands of polysiloxane dispersed over the surface of said organic polymer particles.

20. An aqueous paint composition, comprising:
polysiloxane-composite polymer particles, comprising organic polymer particles having a continuous organic polymer phase and a discontinuous polysiloxane phase, said discontinuous polysiloxane phase comprising localized regions of polysiloxane dispersed in said continuous organic polymer phase;
at least one component selected from the group consisting of fillers, dispersing agents, viscosity increasing agents, plasticizers, adjuvants, hardeners, and leveling agents; and water.

21. The composition according to claim 20, wherein said organic polymer particles are those prepared by emulsion polymerization of monomers comprising:
(a) 50–99.5% by weight of $C_{1-10}$-alkyl (meth)acrylate monomers,
(b) 0.5–15% by weight of ethylenically unsaturated carboxylic acids, and
(c) 0–50% by weight of other ethylenically unsaturated monomers which are copolymerizable with monomers (a) and (b).

22. An aqueous paint composition, comprising:
polysiloxane-composite polymer particles, comprising organic polymer particles having a continuous organic polymer phase and localized islands of polysiloxane dispersed over the surface of said organic polymer particles;
at least one component selected from the group consisting of fillers, dispersing agents, viscosity increasing agents, plasticizers, adjuvants, hardeners, and leveling agents; and water.

23. A process for producing polysiloxane-composite polymer particles, comprising:
(a) forming an aqueous mixture comprising monomers, emulsion polymerizing the monomers in the aqueous mixture at a temperature of from about 40° C. to about 85° C., then lowering the temperature of the aqueous mixture to about 25° C. to form an aqueous dispersion of organic polymer particles; and
(b) adding an organosilane or organosiloxane compound to the aqueous dispersion at a temperature of about 25° C. while stirring, wherein at least 5% of the organosilane or organosiloxane is absorbed into the organic polymer particles, then heating the aqueous dispersion to condense the organosilane or organosiloxane compound and form polysiloxane-composite polymer particles.

* * * * *